(12) United States Patent
Zhou et al.

(10) Patent No.: US 7,359,308 B2
(45) Date of Patent: Apr. 15, 2008

(54) FIXING STRUCTURE FOR OPTICAL ELEMENT AND OPTICAL HEAD DEVICE

(75) Inventors: Yonghai Zhou, Nagano (JP); Tadashi Taguchi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 633 days.

(21) Appl. No.: 10/890,309

(22) Filed: Jul. 12, 2004

(65) Prior Publication Data

US 2005/0036433 A1 Feb. 17, 2005

(30) Foreign Application Priority Data

Jul. 23, 2003 (JP) .............................. 2003-200227

(51) Int. Cl.
*G11B 7/00* (2006.01)

(52) U.S. Cl. .............................. 369/112.28; 369/112.14; 369/112.16; 369/112.24; 359/819; 359/831

(58) Field of Classification Search ........... 369/112.16, 369/112.14, 112.21, 112.28; 359/819, 831
See application file for complete search history.

(56) References Cited

U.S. PATENT DOCUMENTS

| | | | | |
|---|---|---|---|---|
| 5,010,246 A | * | 4/1991 | Tsuyuguchi et al. ......... 250/216 |
| 5,223,970 A | * | 6/1993 | Oono et al. .................. 359/223 |
| 5,237,557 A | * | 8/1993 | Kasahara et al. ...... 369/112.29 |
| 5,396,061 A | * | 3/1995 | Taniguchi et al. ..... 369/110.04 |
| 6,865,743 B2 | * | 3/2005 | Nakata et al. ............... 720/689 |
| 2003/0007258 A1 | * | 1/2003 | Freyhold et al. ............ 359/819 |
| 2003/0043476 A1 | * | 3/2003 | Snively et al. .............. 359/819 |
| 2003/0048550 A1 | * | 3/2003 | Atsumi et al. .............. 359/819 |
| 2004/0095869 A1 | * | 5/2004 | Yoshizawa ............. 369/112.16 |
| 2004/0105378 A1 | * | 6/2004 | Katou et al. ................. 369/121 |
| 2004/0218290 A1 | * | 11/2004 | Ehrne ......................... 359/831 |

\* cited by examiner

*Primary Examiner*—Wayne Young
*Assistant Examiner*—Linh Thi Nguyen
(74) *Attorney, Agent, or Firm*—Reed Smith LLP

(57) ABSTRACT

A fixing structure for an optical element includes a first element face of the optical element, a second element face of the optical element which is orthogonal to the first element face, a first positioning plane of a fixed member which abuts with the first element face of the optical element and is fixed on the first element face with an adhesive, and a second positioning plane of the fixed member which is orthogonal to the first positioning plane and abuts with the second element face of the optical element. The second positioning plane is defined by a small projecting part which protrudes from the fixed member perpendicularly with respect to the first positioning plane to abut with the second element face. The fixing structure for an optical element is preferably applied to an optical head device.

14 Claims, 5 Drawing Sheets

[Fig.1]
(a)
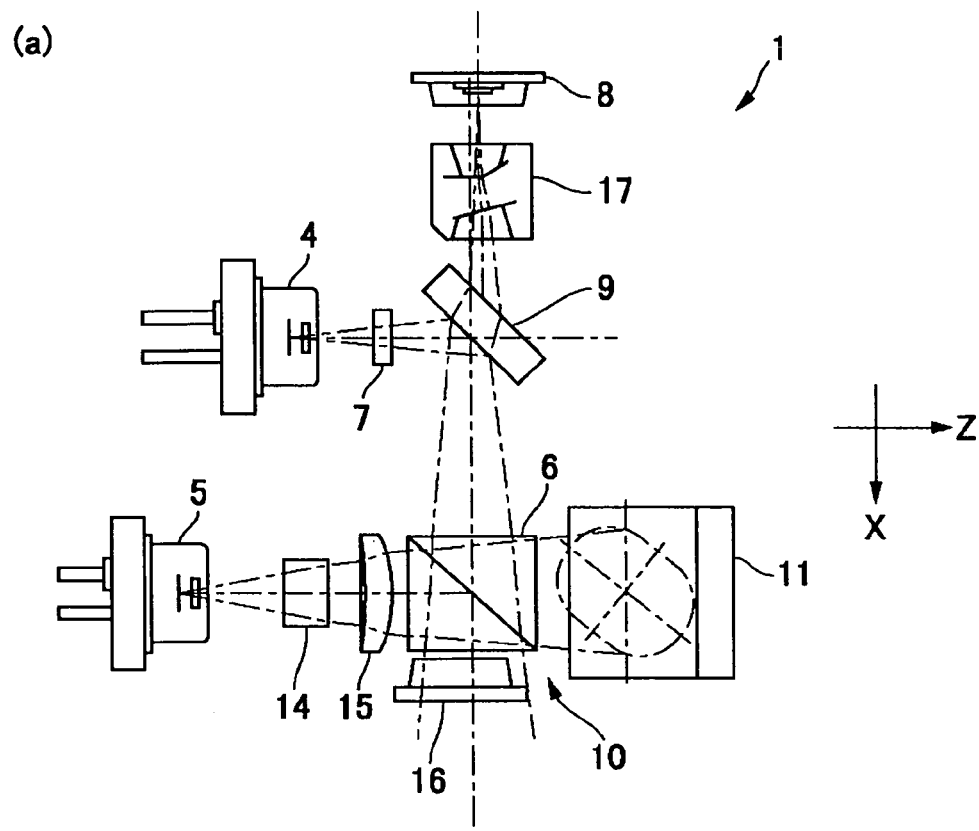
(b)
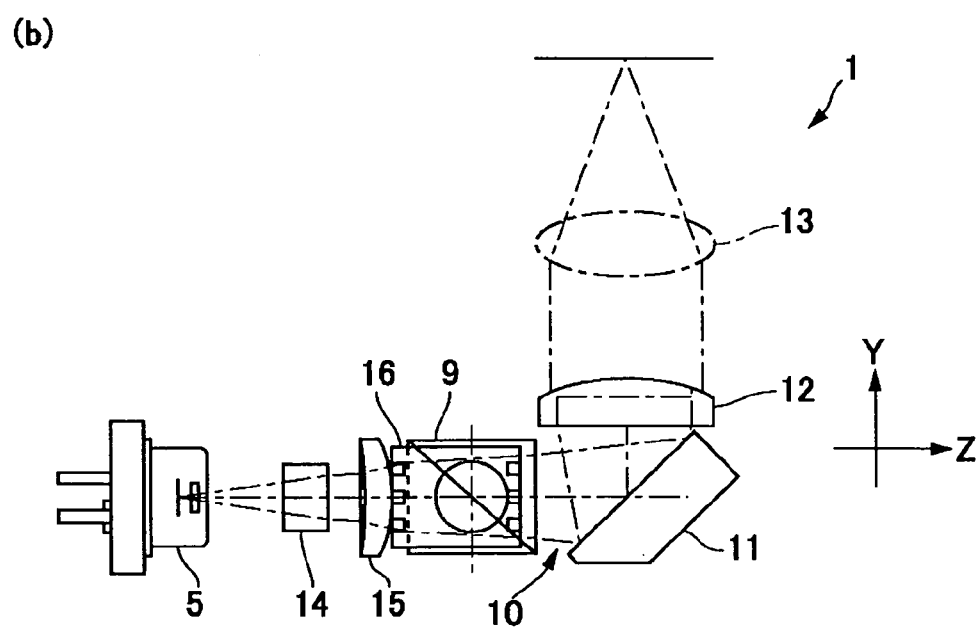

[Fig.2]
(a)
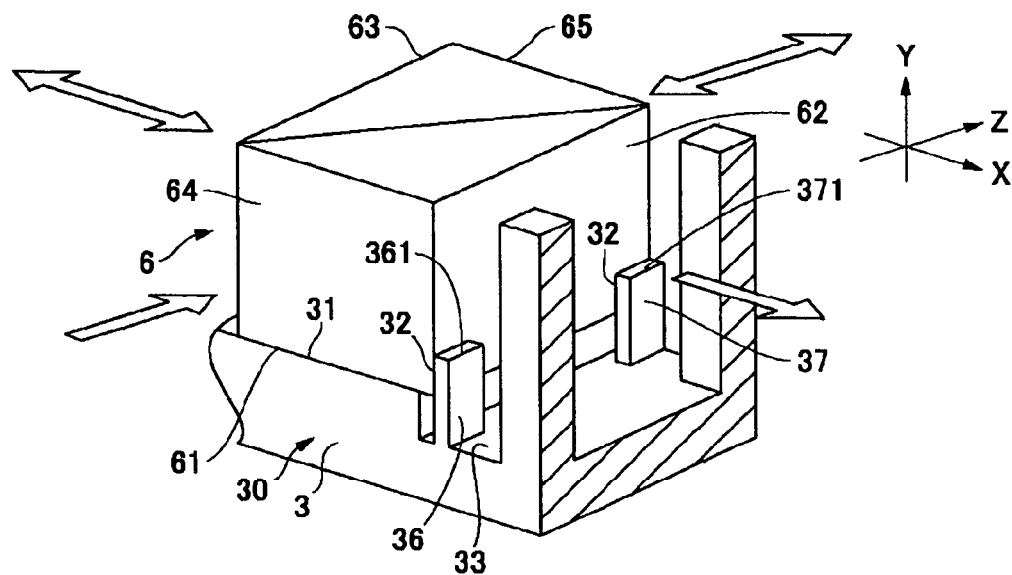
(b)
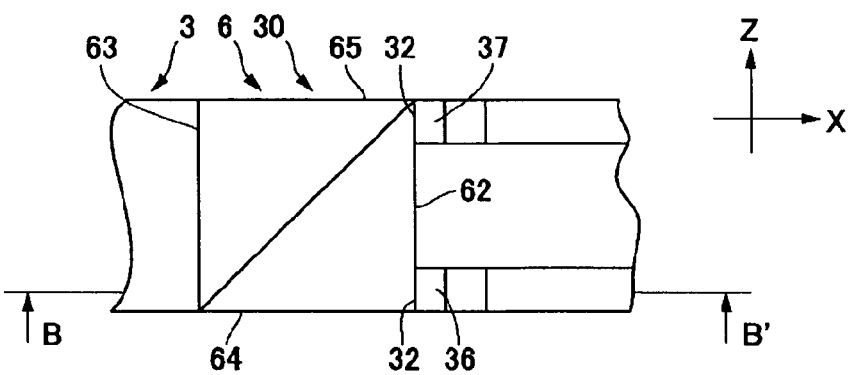
(c)
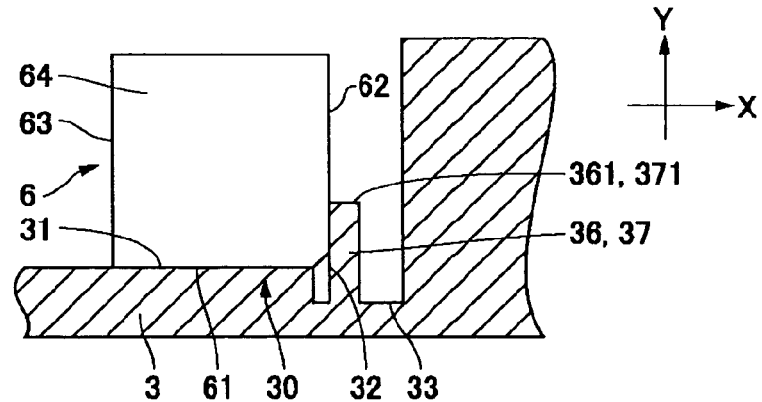

[Fig.3]
(a)
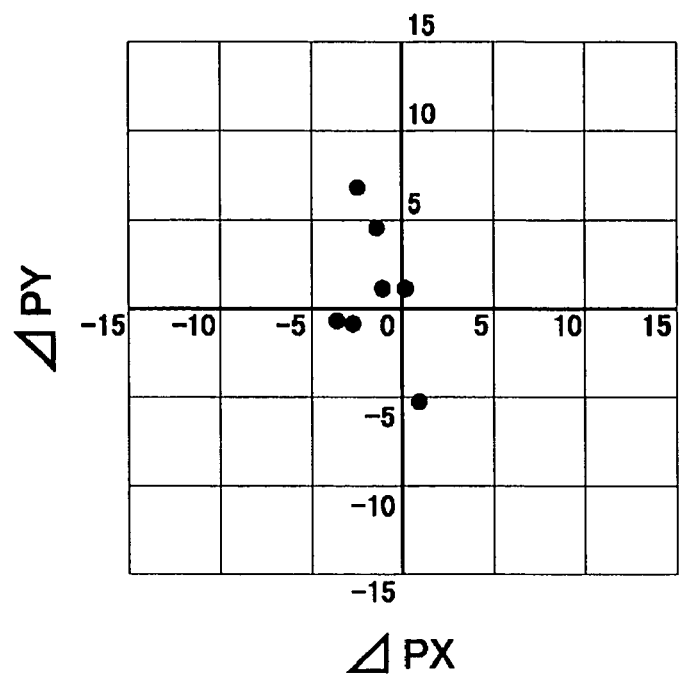
(b)
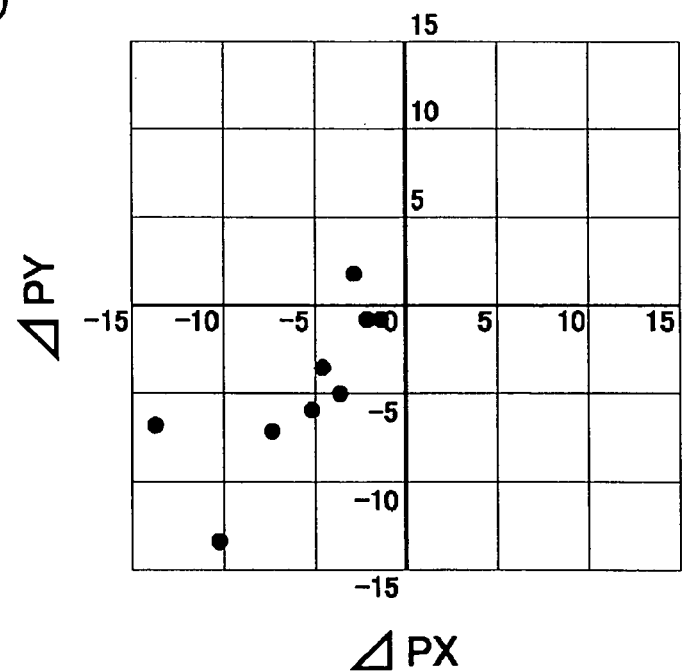

[Fig.4]
(a)
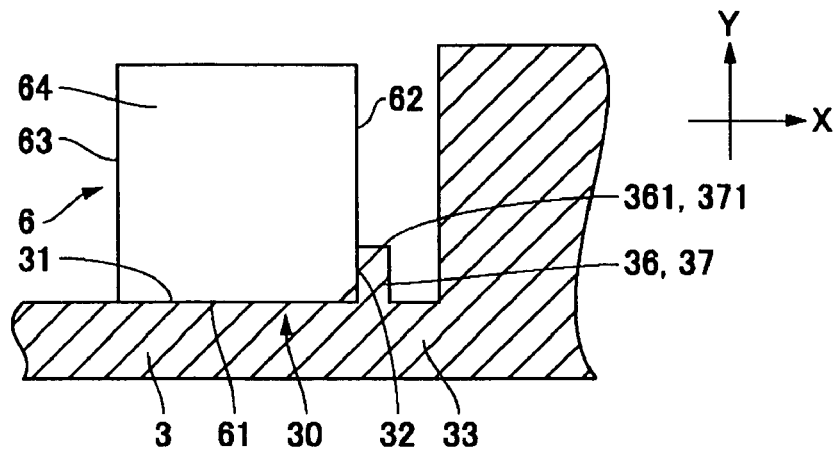
(b)
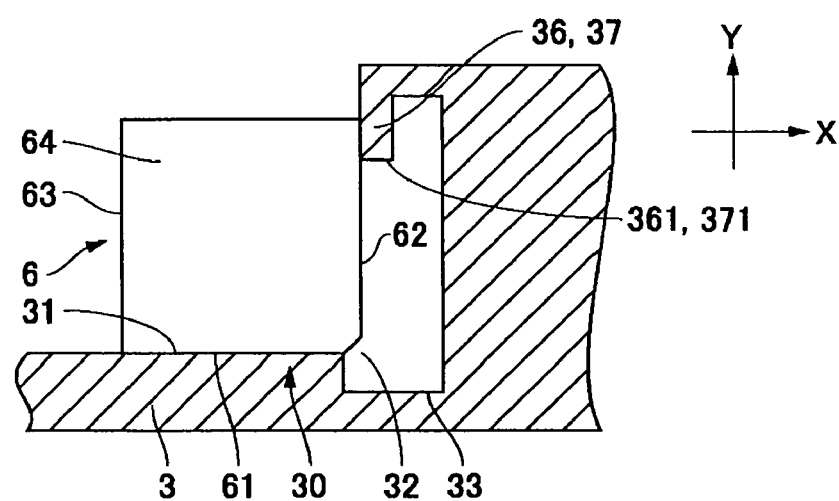

[Fig.5]
(a)
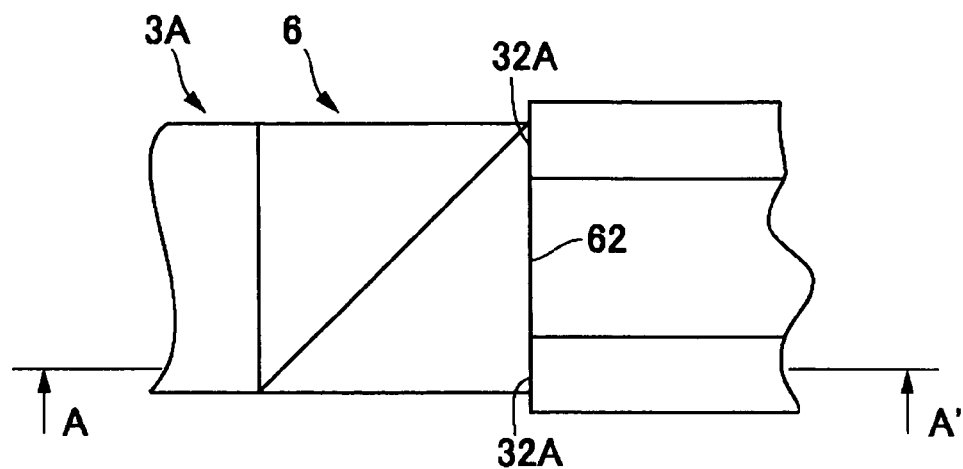
(b)
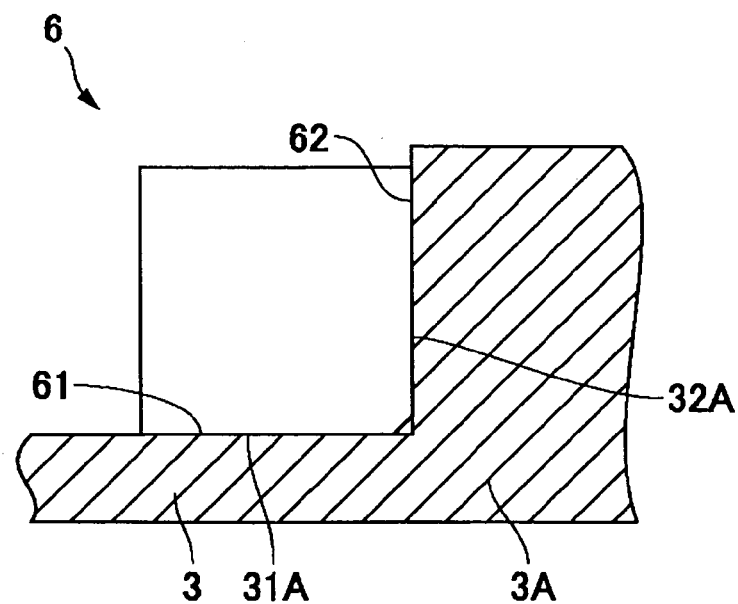

FIXING STRUCTURE FOR OPTICAL ELEMENT AND OPTICAL HEAD DEVICE

CROSS REFERENCE TO RELATED APPLICATIONS

This application claims priority to Japanese Application No. 2003-200227 filed Jul. 23, 2003, which is incorporated herein by reference.

FIELD OF THE INVENTION

The present invention relates to a fixing structure for an optical element to a fixed member and an optical head device.

BACKGROUND OF THE INVENTION

A conventional optical head device is provided with an optical system in which an emitted light beam emitted by a light source is guided to an objective lens to converge at a target position on the recording surface of an optical recording medium such as a CD or a DVD and a return light beam reflected by the optical recording medium is guided to a light receiving element. In the optical head device, adjustment of an optical axis is performed such that various optical elements constructing the optical system are adjustably positioned on a device frame and then fixed on the device frame with an adhesive.

For example, in order to mount a prism 6 for synthesizing and separating optical paths on a device frame 3A as shown in FIG. 5(a) and 5(b), a step portion is formed on the device frame 3A. The step portion is provided with a first positioning plane 31A and a second positioning plane 32A orthogonal to the first positioning plane 31A. The first element face 61 and the second element face 62 of the prism 6 which are orthogonal to each other are respectively positioned by abutting them with the first positioning plane 31A and the second positioning plane 32A. Further, at least the first element face 61 and the first positioning plane 31A are fixed with an adhesive. Consequently, the prism 6 is fixed under the state where the optical axis is adjusted. The device frame 3A is commonly made of aluminum alloy (ADC12).

An optical element such as the prism 6 is normally made of glass but the device frame 3A is made of metal. Therefore, when a variation of environmental temperature occurs, a shearing force acts on the prism 6 from the second positioning plane 32A by the difference of the coefficient of thermal expansion between the prism 6 and the device frame 3A. Especially, when the first positioning plane 31A and the second positioning plane 32A are formed by the step portion of the device frame 3A as the conventional structure where there is no absorbing stress structure provided. As a result, the shearing force is large which acts on the prism 6 from the second positioning plane 32A. Accordingly, when the environmental temperature varies, the position or orientation of the prism 6 may shift and furthermore, may crack the prism 6 or separation of the prism 6 at the adhered face may occur.

Moreover, when the cost of the device frame 3A is reduced by changing the metal material constructing the device frame 3A from aluminum alloy to zinc alloy, such as ZDC2. The coefficients of thermal expansion of the respective materials are represented as follows:

The coefficient of thermal expansion of prism: $7 \times 10^{-6}/°C$.

The coefficient of thermal expansion of aluminum alloy: $21 \times 10^{-6}/°C$.

The coefficient of thermal expansion of zinc alloy: $27 \times 10^{-6}/°C$.

Therefore, the difference of the coefficient of thermal expansion between the prism 6 and the device frame 3A increases. As a result, the above-mentioned problems are even more likely to occur. For example, when the heat cycle tests in the range between $-20°$ C. and $+60°$ C. are performed, the results are shown in FIG. 3(b) which is a graph showing a deviation quantity $\Delta PX$ of the optical axis in the X-direction and a deviation quantity $\Delta PY$ of the optical axis in the Y-direction. As shown in FIG. 3(b), in the conventional optical head device in which the device frame 3A made of zinc alloy is used, the optical axis of the prism 6 widely shifts when the environmental temperature varies.

SUMMARY OF THE INVENTION

In view of the problems described above, it is an object and advantage of the present invention to provide a fixing structure for an optical element capable of preventing the deviation of an optical axis or the damage of the optical element even when the environmental temperature varies, and to provide an optical head device using the fixing structure for an optical element.

In order to achieve the above object and advantage, according to an embodiment of the present invention, there is provided a fixing structure for an optical element including a first element face of the optical element, a second element face of the optical element which is orthogonal to the first element face, a first positioning plane of a fixed member which abuts with the first element face of the optical element and is fixed on the first element face with an adhesive, and a second positioning plane of the fixed member which is orthogonal to the first positioning plane and abuts with the second element face of the optical element. The second positioning plane is defined by a small projecting part which protrudes from the fixed member perpendicularly with respect to the first positioning plane to abut with the second element face.

In accordance with an embodiment of the present invention, the second positioning plane of a device frame is defined by the small projecting part. Therefore, even when a stress is generated due to the difference in the coefficient of thermal expansion between the optical element and the device frame at the time of the variation of the environmental temperature, the stress acts as a force to deform the small projecting part and is absorbed, and thus a large force is not applied to the optical element, such as a prism. Consequently, a positional deviation, cracks, separation of the adhered face and the like do not occur to the prism.

In accordance with an embodiment of the present invention, the dimension of the small projecting part in a protruding direction is set such that a tip end part of the small projecting part is located at a middle position of the second element face. More preferably, the position of the tip part of the small projecting part is set to be at most half of the dimension of the second element face. According to the construction described above, the small projecting part abuts with only a part of the optical element in the protruding direction. Therefore, even when a stress is generated to the fixed member caused by the difference of the coefficient of thermal expansion between the optical element and the device frame, the stress can be absorbed by the deformation of the small projecting part. Consequently, the first element face is not separated from the first positioning plane.

In accordance with an embodiment of the present invention, a recessed part is formed on the fixed member at a position adjacent to the first positioning plane, and the small projecting part is preferably formed to extend from the bottom face of the recessed part in a direction orthogonal to the first positioning plane. According to the construction described above, the actual dimension of the small projecting part can be made longer with respect to the dimension of the small projecting part protruding from the first positioning plane, and thus the small projecting part is easily deformed. Therefore, when a stress is generated in the fixed member due to the difference of the coefficient of thermal expansion between the optical element and the device frame at the time of the variation of the environmental temperature, the stress is surely absorbed by the deformation of the small projecting part. Consequently, a positional deviation, cracks, separation of the adhered face and the like do not occur to the prism.

In accordance with an embodiment of the present invention, it is preferable that the small projecting part is formed to be capable of deforming on the optical element side and on an opposite side of the optical element.

In accordance with an embodiment of the present invention, the second element face of the optical element is an incident face or an emitting face for a light beam and the small projecting part is formed on both side positions across an optical path of the light beam. According to the construction described above, the small projecting part does not obstruct the optical path of the light beam.

In accordance with an embodiment of the present invention, the fixed member is made of zinc alloy. According to the construction described above, the cost can be reduced in comparison with the fixed member made of aluminum or aluminum alloy. When the fixed member is made of zinc or zinc alloy, the difference of the coefficient of thermal expansion between the optical element and the fixed member becomes larger. However, according to the embodiment of the present invention, the positional deviation or the like of the prism is prevented, which is caused due to the stress generated by the difference of the coefficient of thermal expansion. Therefore, even when the fixed member is made of zinc or zinc alloy, the characteristic deterioration does not occur.

The fixing structure for an optical element to which the present invention is applied can be used in an optical head device. In other words, according to an embodiment of the present invention, there is provided an optical head device including a light source, a light receiving element, and an optical system provided with at least an optical element for guiding an emitted beam which is emitted from the light source to an optical recording medium and guiding a return light beam which is the emitted beam reflected by the optical recording medium to the light receiving element. In the optical system, the fixing structure of the present invention is applied to the fixing of the optical element to a device frame.

In accordance with an embodiment of the present invention, the optical system is provided with a prism. The prism is provided with a partially reflecting face, a first element face and a second element face that is orthogonal to the first element face. The fixed member is a frame provided with a first positioning plane, which abuts with the first element face of the prism and is fixed on the first element face with an adhesive, and a second positioning plane, which is orthogonal to the first positioning plane and abuts with the second element face of the prism. The second positioning plane of the frame is constructed by a small projecting part which protrudes from the frame perpendicularly with respect to the first positioning plane to abut with the second element face.

Also, the above-mentioned fixing structure for an optical element can be applied to the fixing structure for the prism. The fixing structure for an optical element of the present invention is not limited to the fixing structure for the prism but may be applied to fixing for other optical elements.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 1(a) is an explanatory plan view showing an optical system of an optical head device in accordance with an embodiment of the present invention and FIG. 1(b) is an explanatory side view showing the optical system viewed from the side of a light receiving element for front monitor.

FIG. 2(a) is a perspective view showing a fixing structure of a prism to a device frame in the optical head device shown in FIG. 1, FIG. 2(b) is its plan view, and FIG. 2(c) is the "B-B'" cross-sectional view in FIG. 2(b).

FIG. 3(a) is a graph showing deviation quantities of the optical axis on the prism when the heat cycle tests in the range between −20° C. and +60° C. are performed in the optical head device to which the present invention is applied. FIG. 3(b) is a graph showing deviation quantities of the optical axis on the prism when the heat cycle tests in the range between −20° C. and +60° C. are performed in the conventional optical head device.

FIGS. 4(a) and 4(b) are explanatory cross-sectional side views respectively showing a fixing structure of the prism in the optical head device in accordance with other embodiments of the present invention.

FIG. 5(a) is a plan view showing a conventional fixing structure of the prism in the optical head device and FIG. 5(b) is the "A-A'" cross-sectional view in FIG. 5(a).

DETAILED DESCRIPTION OF THE PREFERRED EMBODIMENTS

An optical head device to which the present invention is applied will be described below with reference to the accompanying drawings.

FIG. 1(a) is an explanatory plan view showing the optical system of an optical head device in accordance with an embodiment of the present invention and FIG. 1(b) is an explanatory side view showing the optical system viewed from the side of a light receiving element for front monitor.

The optical head device 1 shown in FIGS. 1(a) and 1(b) performs to record onto and reproduce from a CD, a CD-R or a DVD. Optical elements described below are respectively mounted to a device frame (fixed member) described below.

The optical head device 1 in accordance with the embodiment of the present invention is provided as a light source with a first laser diode 4 for a DVD which emits a first laser beam with a wavelength of 650 nm or 635 nm (short wavelength) and a second laser diode 5 for a CD which emits a second laser beam with a wavelength 760-800 nm (long wavelength).

In the embodiment of the present invention, the optical system is constructed such that the first laser beam emitted from the first laser diode 4 and the second laser beam emitted from the second laser diode 5 are guided to a common optical path 10 toward an optical recording medium by using a prism 6 which is an optical element for synthesizing and separating optical paths. A raising mirror 11, a collimating lens 12 and an objective lens 13 are arranged on the common optical path 10 in this order. The objective lens 13 is mounted on an objective lens holder (not shown) of a lens driving device. In the case of the lens driving device of a shaft sliding and turning type, the objective lens holder is supported by a support shaft of a holder support member in a slidable and turnable manner.

In the optical system, in order to guide the first laser beam emitted from the first laser diode 4 and the second laser beam emitted from the second laser diode 5 to the prism 6, a half mirror 9 is disposed on the optical path toward the optical recording medium from the first laser diode 4. The half mirror 9 serves as an optical element for separating the optical path, which partially reflects the first laser beam divided into three beams through a grating lens 7 toward the prism 6, and partially transmits the return light beam from the optical recording medium toward a light receiving element 8. Grating lens 14 and a relay lens 15 are disposed on the optical path from the second laser diode 5 to the prism 6. A sensor lens 17 as an astigmatism generating element is disposed between the half mirror 9 and the light receiving element 8. A light receiving element 16 for front monitor is disposed on the opposite side of the half mirror 9 with respect to the prism 6.

In the optical head device 1 constructed above, after the first laser beam emitted from the first laser diode 4 transmits through the grating lens 7, it is partially reflected by the partially reflecting face of the half mirror 9 and the optical axis of the first laser beam is bent at 90 degrees to be incident on the prism 6. The first laser beam which is incident on the prism 6 is partially reflected by the partially reflecting face of the prism 6 to go toward the collimating lens 12 through the raising mirror 11 on the common optical path 10.

After the second laser beam emitted from the second laser diode 5 transmits the grating lens 14 and the relay lens 15, it is incident on the prism 6. The second laser beam that is incident on the prism 6 is partially reflected by the partially reflecting face of the prism 6 to go toward the collimating lens 12 through the raising mirror 11 on the common optical path 10.

As described above, the laser beam guided to the collimating lens 12 is converted into a parallel light beam and guided to the objective lens 13. As a result, the first laser beam is converged by the objective lens 13 as an optical spot on the recording surface of a DVD that is an optical recording medium. The second laser beam is converged by the objective lens 13 as an optical spot on the recording surface of a CD or a CD-R that is an optical recording medium. Therefore, information can be recorded on the DVD or the CD-R that is the optical recording medium.

When information is reproduced from a DVD or a CD which is an optical recording medium, the return light beam of the laser beam reflected by the optical recording medium returns to the prism 6 through the objective lens 13, the collimating lens 12 and the raising mirror 11. Each of these return light beams is partially reflected by the partially reflecting face of the prism 6 and the optical axis of the return light beam is bent at 90 degrees to be incident on the half mirror 9. The return light beam partially transmits the partially reflecting face of the half mirror 9 to be incident on the sensor lens 17, and then incident on the light receiving element 8 through the sensor lens 17. The sensor lens 17 is a lens for generating an astigmatism in the return light beams of both the laser beams. Therefore, the astigmatism is generated in the return light beam of the laser beam detected by the light receiving element 8 through the sensor lens 17. Accordingly, with the use of a photoelectric element of a quadripartite type in the light receiving element 8, a focusing correction can be performed from the quantities of optical electric currents from the photoelectric element.

FIG. 2(a) is a perspective view showing the fixing structure for the prism to the device frame in the optical head device shown in FIG. 1, FIG. 2(b) is its plan view, and FIG. 2(c) is the "B-B'" cross-sectional view in FIG. 2(b). The X-axis direction, Y-axis direction and Z-axis direction shown by the arrows in FIGS. 2(a), 2(b) and 2(c) are respectively correspond to the directions shown by the arrows in FIGS. 1(a) and 1(b).

The optical system of the optical head device 1 in the present embodiment is mounted on the device frame made of zinc alloy such as ZDC2. A prism mounting part 30 is formed on the device frame 3 to mount the prism 6 as shown in FIGS. 2(a) through 2(c).

The prism 6 is formed in a cube. The bottom face of the prism 6 is the first element face 61 and the prism 6 is provided with the second element face 62 on the side opposed to the light receiving element 16 for front monitor (see FIG. 1(a)). Also, the prism 6 is provided with an element face 63 on which the laser beam emitted from the first laser diode 4 is incident, an element face 64 on which the laser beam emitted from the second laser diode 5 is incident, and an element face 65 which emits the laser beam toward the raising mirror 11.

On the prism mounting part 30 for mounting the prism 6 having the construction described above, the first positioning plane 31 and the second positioning plane 32 which are orthogonal to each other are formed such that the first element face 61 and the second element face 62 of the prism 6, which are orthogonal to each other, respectively abut with the first positioning plane 31 and the second positioning plane 32 to position the prism 6.

In the present embodiment of the present invention, the first positioning plane 31 is formed on the device frame 3 as a surface on which the prism 6 is placed.

A recessed part 33 is formed on the device frame 3 at a position adjacent to the first positioning plane 31. The second positioning plane 32 is formed by a pair of small projecting parts 36, 37 that are perpendicularly erected from the bottom face of the recessed part 33. The second element face 32 is an emitting face for a monitor light beam to the light receiving element 16 for front monitor. Therefore, the small projecting parts 36, 37 are formed on both side positions across the optical path so as to avoid the optical path to the light receiving element 16 for front monitor.

The plate thickness of the small projecting parts 36, 37 in the X direction are set to be 0.7 mm such that they can deform on the prism 6 side and the opposite side. Also, the small projecting parts 36, 37 are formed with the height dimension (Y-direction) of 1.55 mm, the plate thickness (X-direction) of 0.7 mm, and the width dimension (Z-direction) of 0.3-0.7 mm. Since the small projecting parts 36, 37 are formed and erected from the bottom face of the recessed part 33, the protruding dimension (Y-direction) of the small projecting parts 36, 37 are 0.2-1 mm from the first positioning plane 31.

In the prism mounting part 30 having a construction described above, the prism 6 is placed on the first positioning plane 31 and then pushed toward the small projecting parts 36, 37 which are the second positioning plane 32. As a result, the first element face 61 abuts with the first positioning plane 31 to perform the positioning of the prism 6 in the Y-direction.

The second element face 62 abuts with the second positioning plane 32 (small projecting parts 36, 37) to perform the positioning of the prism 6 in the X-direction. Since the small projecting parts 36, 37 defining the second positioning plane 32 are erected from the bottom face of the recessed part 33, the protruding dimension from the first positioning plane 31 is short in comparison with its height dimension. Therefore, the dimension of the small projecting parts 36, 37 in the protruding direction is set to be such that upper end parts 361, 371 of the small projecting parts 36, 37 are set at a middle position of the second element face 62. Concretely, the upper tip end parts 361, 371 are preferably set at a position lower than the half of the height dimension of the second element face 62. Accordingly, the upper tip end parts 361, 371 of the small projecting parts 36, 37 do not reach to the upper end of the second element face 62 and the small projecting parts 36, 37 abut with only a part of the prism 6 in the protruding direction. Consequently, the abutting area between the second element face 62 and the second positioning plane 32 (small projecting parts 36, 37) is small.

In the embodiment described above, the second element face 62 abuts with the second positioning plane 32 (small projecting parts 36, 37) to perform the positioning of the prism 6 in the X-direction, in other words, the positioning of the prism 6 on the light receiving element 16 side for front monitor. The direction of the positioning of the prism 6 is not limited to the above-mentioned embodiment. The second positioning plane 32 (small projecting parts 36, 37) can be applied to the positioning on the raising mirror 11 side in the Z-direction or to the positioning on the relay lens 15 side.

After the position of the prism 6 has been adjusted as described above, the first element face 61 is fixed with an adhesive (not shown). The adhesive is coated on the first element face 61 in advance before the prism 6 is placed on the first positioning plane 31. After the position of the prism 6 is adjusted, the adhesive is cured by means such as ultraviolet irradiation, heating, or retaining under an anaerobic state.

As described above, in the optical head device 1 of the embodiment of the present invention, the first element face 61 of the prism 6 is adhered and fixed on the first positioning plane 31 in a positioned manner. Also, the second element face 62 abuts with the second positioning plane 32 that is defined by the small projecting parts 36, 37, which can be deformed. Therefore, when a stress is generated due to the difference of the coefficient of thermal expansion between the device frame 3 made of zinc alloy and the prism 6 made of glass at the time of the variation of the environmental temperature, the stress acts as a force to deform the small projecting parts 36, 37 and is absorbed. Therefore, a large force is not applied to the prism 6. Consequently, a positional deviation, cracks, separation of the adhered face and the like do not occur to the prism 6.

Further, since the abutting area between the second element face 62 and the small projecting parts 36, 37 is small, the first element face 61 does not separate from the first positioning plane 31 even when the small projecting parts 36, 37 are deformed.

In addition, the small projecting parts 36, 37 are erected from the bottom face of the recessed part 33 that is formed on the device frame 3. Therefore, since the height dimension of the small projecting parts 36, 37 protruding from the first positioning plane 31 is short, the abutting area between the second element face 62 and the small projecting parts 36, 37 is extremely small but the actual dimension of the small projecting parts 36, 37 is long. Accordingly, the small projecting parts 36, 37 are easily deformed, the stress caused by the difference of the coefficient of thermal expansion between the prism 6 and the device frame 3 is surely absorbed by the deformation of the small projecting parts 36, 37. Consequently, a positional deviation, cracks, separation of the adhered face and the like do not occur to the prism 6.

Further, since the small projecting parts 36, 37 are formed on both side positions across the optical path, the optical path is not blocked by the small projecting parts 36, 37.

In addition, in the embodiment of the present invention, since the device frame 3 made of zinc alloy is used, the cost is reduced in comparison with the conventional device frame made of aluminum alloy. When the device frame 3 is made of zinc alloy, the difference of the coefficient of thermal expansion between the prism 6 and the device frame 3 becomes large. However, in the embodiment of the present invention, since the stress due to the difference of the coefficient of thermal expansion is absorbed by the deformation of the small projecting parts 36, 37, the characteristic deterioration does not occur even when the device frame 3 is made of zinc alloy.

As an example, the results are shown in FIG. 3(*a*), which is a graph showing deviation quantities ($\Delta PX$, $\Delta PY$) of the optical axis in the X-direction and the Y-direction when the heat cycle tests in the range between $-20°$ C. and $+60°$ C. are performed in the optical head device 1 which uses the device frame 3 made of zinc alloy. The deviation of the optical axis is extremely small in comparison with the conventional example shown in FIG. 3(*b*).

In the embodiment of the present invention described above, the recessed part 33 is formed on the device frame 3 and the small projecting part 36, 37 are erected from the bottom face of the recessed part 33. However, as shown in FIG. 4(*a*), the small projecting parts 36, 37 may be directly erected from the same face as the first positioning plane 31 at a position adjacent to the first positioning plane 31 without the recessed part 33. Alternatively, as shown in FIG. 4(*b*), the small projecting parts 36, 37 may be formed downward perpendicularly from an upper position of the prism 6 toward the first positioning plane 31.

In addition, in the embodiment of the present invention described above, the optical element to which the present invention is applied is the prism 6. However, the present invention may be applied to fixing for other optical elements besides the prism 6 on the device frame 3.

As described above, in the optical head device in accordance with the embodiment of the present invention, the first element face of the optical element is positioned by the first positioning plane and the second positioning plane for positioning the second element face of the optical element is positioned by the small projecting part. Accordingly, when a stress is generated due to the difference of the coefficient of thermal expansion between the optical element and the device frame at the time of the variation of the environmental temperature, the stress acts as a force to deform the small projecting part and is absorbed, and thus a large force is not applied to the optical element such as a prism. Consequently, a positional deviation, cracks, separation of the adhered face and the like do not occur to the prism.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A fixing structure for an optical element comprising:
   a first element face of the optical element;
   a second element face of the optical element which is orthogonal to the first element face;
   a first positioning plane of a fixed member which abuts with the first element face of the optical element and is fixed on the first element face with an adhesive;
   a recessed part which is formed on the fixed member at a position adjacent to the first positioning plane; and
   a second positioning plane of the fixed member which is orthogonal to the first positioning plane and abuts with the second element face of the optical element,
   wherein the second positioning plane is defined by a small projecting part which protrudes from the recessed part of the fixed member perpendicularly with respect to the first positioning plane to abut with the second element face so that the small projecting part is deformable when a stress is generated due to difference of coefficient of thermal expansion between the optical element and the fixed member.

2. The fixing structure for an optical element according to claim 1, wherein the dimension of the small projecting part in a protruding direction is set such that a tip end part of the small projecting part is located at a middle position of the second element face.

3. The fixing structure for an optical element according to claim 1, further comprising a recessed part formed on the fixed member at a position adjacent to the first positioning plane, wherein the small projecting part is formed to extend from a bottom face of the recessed part in a direction orthogonal to the first positioning plane.

4. The fixing structure for an optical element according to claim 1, wherein the small projecting part is capable of deforming on the optical element side and on an opposite side of the optical element.

5. The fixing structure for an optical element according to claim 1, wherein the second element face of the optical element is an incident face or an emitting face for a light beam and the small projecting part is formed on both side positions across an optical path of the light beam.

6. The fixing structure for an optical element according to claim 1, wherein the fixed member is made of zinc alloy.

7. An optical head device comprising:
   a light source;
   a light receiving element; and
   an optical system provided with at least an optical element for guiding an emitted beam which is emitted from the light source to an optical recording medium and guiding a return light beam which is the emitted beam reflected by the optical recording medium to the light receiving element,
   wherein a fixing structure for the optical element comprising:
   a first element face of the optical element;
   a second element face of the optical element which is orthogonal to the first element face;
   a first positioning plane of a fixed member which abuts with the first element face of the optical element and is fixed on the first element face with an adhesive; and
   a recessed part which is formed on the fixed member at a position adjacent to the first positioning plane; and
   a second positioning plane of the fixed member which is orthogonal to the first positioning plane and abuts with the second element face of the optical element,
   wherein the second positioning plane is defined by a small projecting part which protrudes from the recessed part of the fixed member perpendicularly with respect to the first positioning plane to abut with the second element face so that the small projecting part is deformable when a stress is generated due to difference of coefficient of thermal expansion between the optical element and the fixed member.

8. The optical head device according to claim 7, wherein the optical element is a prism.

9. The optical head device according to claim 8, wherein the fixed member is a frame having the first positioning plane and the second positioning plane, and the prism is provided with a partially reflecting face, the first element face and the second element face.

10. The optical head device according to claim 9, wherein the dimension of the small projecting part in a protruding direction is set such that a tip end part of the small projecting part is located at a position lower than the half of the height dimension of the second said element face.

11. The optical head device according to claim 10, further comprising a recessed part formed on the frame at a position adjacent to the first positioning plane, wherein the small projecting part is formed to extend from a bottom face of the recessed part in a direction orthogonal to the first said positioning plane.

12. The optical head device according to claim 10, wherein the small projecting part is capable of deforming on the prism side and on an opposite side of the prism.

13. The optical head device according to claim 8, wherein the prism is an optical element for synthesizing and separating optical paths which is used to guide a first laser beam emitted from a first laser diode and a second laser beam emitted from a second laser diode to a common optical path toward the optical recording medium.

14. The fixing structure for an optical element according to claim 1, wherein the small projecting part is formed in a plate shape whose thickness in the optical element direction is thinner so that the small projecting part is deformable on the optical element side and its opposite side.

* * * * *